(12) United States Patent
Osman et al.

(10) Patent No.: US 10,033,847 B2
(45) Date of Patent: Jul. 24, 2018

(54) DROPPED CALL WARNING AND PREVENTION METHODS

(71) Applicant: Sony Computer Entertainment America LLC, San Mateo, CA (US)

(72) Inventors: Steven Osman, San Francisco, CA (US); Victor Octav Suba Miura, Foster City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 14/170,423

(22) Filed: Jan. 31, 2014

(65) Prior Publication Data
US 2015/0094054 A1  Apr. 2, 2015

Related U.S. Application Data

(60) Provisional application No. 61/884,904, filed on Sep. 30, 2013.

(51) Int. Cl.
*H04W 68/00* (2009.01)
*H04W 76/00* (2018.01)
(Continued)

(52) U.S. Cl.
CPC ....... *H04M 1/72516* (2013.01); *H04W 68/00* (2013.01); *H04W 76/00* (2013.01); *H04W 36/14* (2013.01); *H04W 36/32* (2013.01)

(58) Field of Classification Search
CPC .................... H04M 1/72516; H04M 1/72519; H04W 4/16
See application file for complete search history.

(56) References Cited

U.S. PATENT DOCUMENTS 3,862,379 A   1/1975  Pless
4,955,729 A   9/1990  Marx
(Continued)

FOREIGN PATENT DOCUMENTS

EP          1199867        4/2002
WO       2008/021634       2/2008
WO     WO2015047603 A1     4/2015

OTHER PUBLICATIONS

International Search Report for PCT/US2007/073064 dated Apr. 29, 2008.
(Continued)

*Primary Examiner* — Frantz Bataille
(74) *Attorney, Agent, or Firm* — Carr & Ferrell LLP

(57) ABSTRACT

The disclosure provides methods and systems for warning users of mobile terminals during active phone calls or active data transfer that they approach certain geographical areas known as areas where active phone calls or active data transfer may be interrupted. In one embodiment, a method includes obtaining, by a processor, location information associated with a mobile terminal, determining, by the processor, that the mobile terminal approaches a particular geographical area, the particular geographical area being associated with previous dropped calls based at least in part on historical data, and, based on the determination, sending, by the processor, a warning signal to the mobile terminal for informing a user of the mobile terminal that the mobile terminal is about to enter the particular geographical area.

18 Claims, 7 Drawing Sheets

(51) Int. Cl.
*H04W 36/32* (2009.01)
*H04W 36/14* (2009.01)
*H04M 1/725* (2006.01)

(56) References Cited

U.S. PATENT DOCUMENTS

| | | |
|---|---|---|
| 5,144,678 A | 9/1992 | Lenz |
| 5,182,677 A | 1/1993 | Kizu et al. |
| 5,434,678 A | 7/1995 | Abecassis |
| 5,473,676 A | 12/1995 | Frick et al. |
| 5,623,588 A | 4/1997 | Gould |
| 5,913,013 A | 6/1999 | Abecassis |
| 5,973,683 A | 10/1999 | Cragun et al. |
| 5,983,214 A | 11/1999 | Lang et al. |
| 6,035,047 A | 3/2000 | Lewis |
| 6,069,960 A | 5/2000 | Mizukami et al. |
| 6,266,649 B1 | 7/2001 | Linden et al. |
| 6,330,438 B1 | 12/2001 | McClelland et al. |
| 6,381,455 B1 | 4/2002 | Smolik |
| 6,393,158 B1 | 5/2002 | Gould et al. |
| 6,438,579 B1 | 8/2002 | Hosken |
| 6,553,566 B1 | 4/2003 | Grant et al. |
| 6,621,980 B1 | 9/2003 | Gould et al. |
| 6,704,428 B1 | 3/2004 | Wurtz |
| 6,704,491 B1 | 3/2004 | Revis |
| 6,985,592 B1 | 1/2006 | Ban et al. |
| 7,010,332 B1 | 3/2006 | Irvin et al. |
| 7,076,245 B1 | 7/2006 | Satapathy |
| 7,089,246 B1 | 8/2006 | O'Laughlen |
| 7,103,188 B1 | 9/2006 | Jones |
| 7,230,530 B1* | 6/2007 | Almquist ............... B60N 2/002 180/271 |
| 7,418,103 B2 | 8/2008 | Sargaison |
| 7,551,920 B1* | 6/2009 | Ngan ............... H04M 1/72516 455/417 |
| 8,350,694 B1* | 1/2013 | Trundle ............... G08B 25/08 340/539.11 |
| RE44,980 E | 7/2014 | Sargaison |
| 2001/0046304 A1 | 11/2001 | Rast |
| 2002/0120925 A1 | 8/2002 | Logan |
| 2003/0172374 A1 | 9/2003 | Vinson et al. |
| 2004/0042629 A1 | 3/2004 | Mellone et al. |
| 2004/0258253 A1 | 12/2004 | Wurtz |
| 2005/0201568 A1 | 9/2005 | Goyal |
| 2006/0020459 A1* | 1/2006 | Carter ............... G07C 9/00158 704/246 |
| 2006/0029234 A1 | 2/2006 | Sargaison |
| 2006/0068731 A1* | 3/2006 | Seier ............... H04M 1/72516 455/226.2 |
| 2006/0215847 A1 | 9/2006 | Hollemans et al. |
| 2006/0242309 A1 | 10/2006 | Damick et al. |
| 2006/0288041 A1 | 12/2006 | Plastina et al. |
| 2007/0250901 A1 | 10/2007 | McIntire et al. |
| 2007/0299833 A1 | 12/2007 | Viljamaa et al. |
| 2008/0040380 A1 | 2/2008 | Miyaki |
| 2008/0040748 A1 | 2/2008 | Miyaki |
| 2008/0214111 A1* | 9/2008 | Moshir ............... H04M 1/66 455/41.2 |
| 2010/0228478 A1* | 9/2010 | You ............... G01C 21/32 701/533 |
| 2011/0029370 A1* | 2/2011 | Roeding ............... G06Q 30/00 705/14.38 |
| 2012/0220290 A1* | 8/2012 | Awad ............... H04M 3/2227 455/423 |
| 2013/0176997 A1* | 7/2013 | Tian ............... H04W 56/0085 370/336 |

OTHER PUBLICATIONS

International Search Report for PCT/US2014/051863 dated Nov. 26, 2014.

* cited by examiner

DROPPED CALL WARNING AND PREVENTION METHODS

CROSS REFERENCE TO RELATED APPLICATIONS

This application claims the priority benefit of U.S. provisional application No. 61/884,904, filed Sep. 30, 2013, and titled "Dropped Call Warning and Prevention Methods." The above-referenced application is hereby incorporated by reference in its entirety.

TECHNICAL FIELD

This disclosure relates generally to wireless communication and, more particularly, to the technology for warning and preventing dropped calls caused by a mobile terminal entering an area not served by a communications network.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Wireless communications networks are widely deployed to provide various communications services including telephony, messaging, broadcasts, transferring of video, data, and so forth. These networks, which are typically multiple access networks, support communications to multiple users by sharing available network resources. Some examples of wireless communications networks include Global System for Mobile communication (GSM) networks, Long Term Evolution (LTE) networks, Universal Mobile Telecommunication System (UMTS) networks, UMTS Terrestrial Radio Access Networks (UTRAN), Code Division Multiple Access (CDMA) networks, Orthogonal Frequency-Division Multiplexing (OFDM) networks, Enhanced Data Ranges for GSM Evolution (EDGE) networks, and so forth.

As the demand for mobile broadband access continues to increase, research and development continue to advance wireless communication technologies not only to meet growing demand, but also to advance the user experience with wireless communication networks. An important class of problems relates to accidental and sometimes temporal drop of services caused, for example, by moving a mobile terminal through an area not served by a wireless communication network. Dropped calls are often a frustrating experience which cannot be necessarily solved by extending coverage of wireless communication networks or establishing new base stations.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is directed to the technology for warning users of wireless communication networks when loss of connection with a communications network is anticipated based on predetermined criteria. The present technology also provides for mechanisms to prevent possible dropped call events by performing handover procedures also based on multiple predetermined criteria.

According to one aspect of the embodiments disclosed herein, provided is a phone call drop prevention method. The method may include obtaining, by a processor, location information associated with a mobile terminal. The mobile terminal is associated with a communication network which may include a wireless communications network such as a cellular network (e.g., GSM, LTE, CDMA, OFDM, etc.) or wireless local area network (e.g., Bluetooth, WiFi, WiMax, and network based on IEEE 802.11 standards). The method may further include predicting, by the processor, that the mobile terminal approaches a particular geographical area. The prediction may be based on anticipation of a distance between a current location of the mobile terminal and the particular geographical area or a time period before the mobile terminal enters the particular geographical area. The method may further include determining, by the processor, that the particular geographical area is associated with previous dropped calls based at least in part on historical data. The historical data may be remotely stored and include aggregated information received from multiple users. Furthermore, the method may include generating and sending, by the processor and based at least in part on the determination, a warning signal to the mobile terminal for indicating to a user of the mobile terminal that the mobile terminal is about to enter a particular geographical area.

In certain embodiments, a warning signal may be sent to the mobile terminal when the anticipated distance is smaller than a threshold distance value. In other embodiments, the warning signal may be sent to the mobile terminal when the time period is smaller than a threshold time value.

In yet other embodiments, the method may include obtaining a model and make information associated with the mobile terminal. In these embodiments, the warning signal may be sent to the mobile terminal when the distance is smaller than a threshold distance value associated with the model and make information.

In yet other embodiments, the method may include obtaining model and make information of the mobile terminal and anticipating a time period before the mobile terminal enters the particular geographical area. In these embodiments, the warning signal may be sent to the mobile terminal when the time period is smaller than a threshold time value associated with the model and make information.

In various embodiments, the warning signal may include an audio message. The warning signal may also include a displayable message. In certain embodiments, the method may further include sending, by the processor, the warning signal to at least one third party mobile terminal that is associated with the same call but different from the mobile terminal used by the user.

In certain embodiments, the predetermined geographical area may be associated with an area not being served by the communications network. The historical data may include aggregated data from multiple sources associated with other users of the communications network who experienced dropped calls within the particular geographical area. In certain embodiments, the method may further include facilitating, by the processor, a handoff procedure to another communications network in response to the determination that the mobile terminal approaches the particular geographical area associated with the previous dropped calls.

In certain embodiments, the method may further include determining, by the processor, that the mobile terminal is within the particular geographical area and the connection with the communications network is lost, recording, by the processor, a speech of the user while the mobile terminal is within the particular geographical area, determining, by the processor, that the mobile terminal is out of the particular geographical area and the connection with the communications network is restored, and sending, by the processor, the speech of the user recorded, while the mobile terminal was within the particular geographical area, to at least one third party mobile terminal that involved into the same call.

In certain embodiments, the method may further include updating, by the processor, the historical data if the call is dropped within the predetermined geographical area. The processor may pertain to the mobile terminal, or alternatively relate to communications network infrastructure which is not associated with the mobile terminal.

According to another aspect of the present disclosure, provided is a phone call drop prevention method. The method may include obtaining, by a processor, location information of a mobile terminal. The method may further include predicting, by the processor, that the mobile terminal approaches a particular geographical area. The method may further include determining, by the processor, that the particular geographical area is not served by a first communications network based at least in part on historical data. The method may further include facilitating, by the processor and based on the determination, a handoff procedure of the mobile terminal from the first communications network to a second communications network, being different from the first communications network. In certain embodiments, the first communication network may be based on a first communication standard, the second communication network may be based on a second communication standard, and the first communication standard differs from the second communication standard.

According to another aspect of the present disclosure, provided is a phone call drop prevention method. The method may include obtaining, by a processor, location information of a mobile terminal. The method may further include anticipating, by the processor, that the mobile terminal approaches a particular geographical area. The method may further include determining, by the processor, that the particular geographical area is associated with historical data.

Furthermore, based on the determination, the processor may send a warning signal to the mobile terminal to notify a user of the mobile terminal that the mobile terminal is about to enter the particular geographical area. The method may further include a handoff procedure of the mobile terminal from a first communications network to a second communications network.

In further embodiments, the method steps are stored on a machine-readable medium comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

Figure 1:
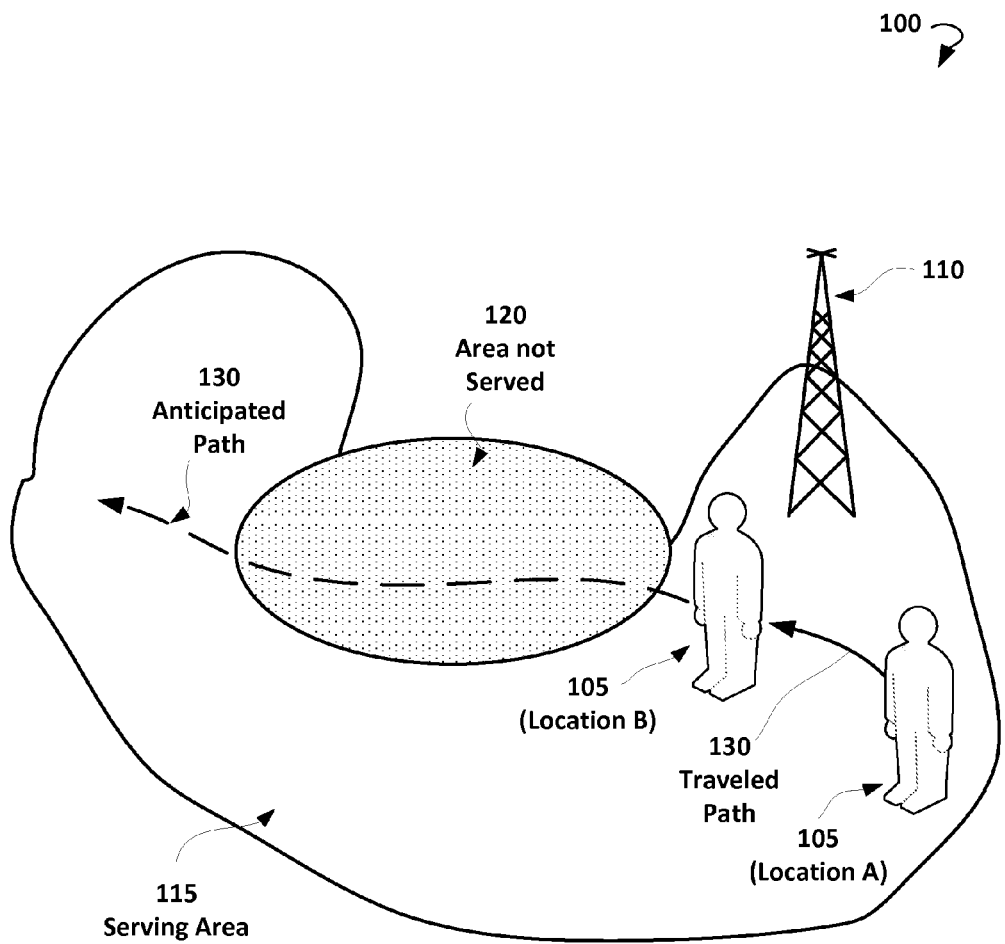
FIG. 1 shows an example system environment suitable for employing methods for warning and preventing interruptions in communication services.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a mobile terminal, cellular phone, smart phone, computer (e.g., a desktop computer, tablet computer, laptop computer), game console, handheld gaming device, navigation device, and so forth.

In general, the embodiments of the present disclosure are directed to methods and systems for warning users of mobile terminals during active phone calls or active data transfer that they are approaching certain geographical areas, which are known as areas where the active phone calls or active data transfer may be interrupted. The interruption of such service may be caused, for example, by a communications network not operating in certain geographical areas or zones (e.g., mountainous areas, desert areas, tunnels, inside buildings, and so forth). In other embodiments of the present disclosure, provided are methods and systems for preventing dropped calls or loss of service during active phone calls or data transfer.

A warning may include presenting a predetermined audio message (e.g., a recorded information message, melody, and so forth), a displayable message, or a combination of both. The warning may be presented to either a first party that approaches certain geographical area, a second party, which is in communication with the first party, or to both parties.

The determination that the user of the mobile terminal, such as a cellular phone, during an active phone call or active data transfer, approaches a certain geographical area, where the call or data transfer can be interrupted, by dynamically tracking the current location of the mobile terminal and anticipating a distance between the current location of the terminal and said certain geographical area, a time period before the mobile terminal enters the certain geographical area (e.g., based on the user's speed), or a combination of both.

For example, it may be determined that the distance between the current location of the mobile terminal and the certain geographical area may be less than a predetermined threshold value, and if this is the case, a warning signal may be generated and sent out. Similarly, it may be determined that the time period required for the mobile terminal to travel from the current location to a boundary of the certain geographical area, anticipated on the known mobile terminal's speed, may be less than a predetermined threshold value, and if this is the case, a warning signal may be generated and sent out. The predetermined threshold values in these anticipation and prediction processes may also be associated with mobile terminal models and/or makes.

While various mobile terminals may have different antennas, hardware and software components, the reception of wirelessly transmitted signal may also be different. In this regard, the dimensions of said geographical areas, within which calls or data transfer may be interrupted, may also depend on the model and/or make of the mobile terminal used. Thus, the anticipation and prediction processes discussed herein may also include obtaining information concerning the mobile terminal being used by the user.

The information indicating that certain geographical areas may cause drop of phone calls or interruption in data transfer may be stored locally on the mobile terminal or on a remote device (e.g., server, web server, within the infrastructure of the wireless communication terminal, remote database, and so forth). In various embodiments, a database containing information concerning these geographical areas may be based on one or more crowd-sourcing means that allow manual or automated aggregation of information concerning dropped calls or interrupted data transfer every time subscribers experience dropped calls or interruptions of data transfer.

In some example embodiments of the present disclosure, the dropped calls or interruptions of data transfer may be prevented or mitigated in addition to the discussed warnings. In particular, in those circumstances where the interruption of service lasts less than a predetermined amount of time, such as less than five seconds, users may be made unaware the temporal interruption. For example, once it is determined that the user has entered a certain geographical area where the data transfer or call is temporarily interrupted, speech of one or more call participants may be recorded and played back when the service is restored.

Additionally, upon determining that the mobile terminal, such as mobile device or a navigational device, is about to enter the geographical area where the data transfer can be temporarily interrupted, a transfer of data that may be needed for that geographical area may be performed ahead of time. For example, the mobile device or the navigational system can utilize various mapping services, live traffic updates, and so forth. To avoid interruption of these services, the navigational system can pre-load maps and traffic information for the geographical area with poor data reception ahead of time. Upon entering the geographical area with poor data service the preloaded data can be used offline. Thus, at least map access can be ensured in the area with poor coverage and the service will not be interrupted.

In other embodiments, the loss of service can be alleviated by a handover of call. In particular, the handover may be automatically performed from first communications network to a second communications network. In some example embodiments, the first communication network may employ a technology different from the one employed by the second communication network. For example, the first communication network may be an LTE network, while the second communication network may be a CDMA network. Alternatively, the first and second communication networks may employ the same technology, but operated by different communication companies.

Furthermore, the technologies described herein may be implemented by a software code running on a mobile terminal, a remote server, devices associated with the communication network, or any combination thereof. For example, the mobile terminal may run a software application which enables the mobile terminal to warn and/or prevent drops in communication services as described herein.

Now, with reference to the drawings, described are some example embodiments of the present disclosure. FIG. 1 shows an example system environment 100 suitable for employing methods for warning and/or preventing interruption in communication services as described herein. In particular, a user 105 may utilize a mobile terminal by making a call or performing a data transfer to at least a base station 110 (also known as a tower). As shown in FIG. 1, the user is moving within a serving area 115 during the active phone call or active data transfer. The serving area 115 may refer to a cell of mobile network or a zone covered by a wireless communication network of any other suitable technology. Also shown is an unserved area 120, also known as "dead zone", which is either known as the area where phone calls may be dropped/lost, where data transfers may be interrupted, or as the area not covered by the communication network, not reachable by radio signals generated by the base station 110, or any combination thereof.

According to principles of the present disclosure, the current location of the user 105 may be dynamically tracked (e.g., determined each ten seconds). This can be done, for example, by obtaining location data from the mobile terminal, which may employ a GPS module, or by utilizing a triangulation technique. Furthermore, it may be determined that the user 105 approaches the unserved area 120. As shown in FIG. 1, the user may move from the location A to the location B. Based on the location information aggregated over a period of time, determinations can be made as to a traveled path 130 and associated parameters such as a speed, an average speed, geographical coordinates, model and make of the mobile terminal, strengths of signals received from the base station 110, geographical map of the areas 115, 120, and so forth. Accordingly, this information may be processed to anticipate whether the user 105 is about to enter the unserved area 120 and if so, when it may happen. For example, it may be predicted how far the user 105 is from the unserved area 120 or what time may be required for the user 105 to enter the unserved area 120. If the anticipated distance (or the time period) is below a certain predetermined value, a warning and/or prevention procedure against a loss of service may be initiated. In one embodiment, the user 105 may be provided with an audio or displayable warning message. In other embodiments, the communication service may be transmitted to another network or base station of the same network (handover).

Figure 2:
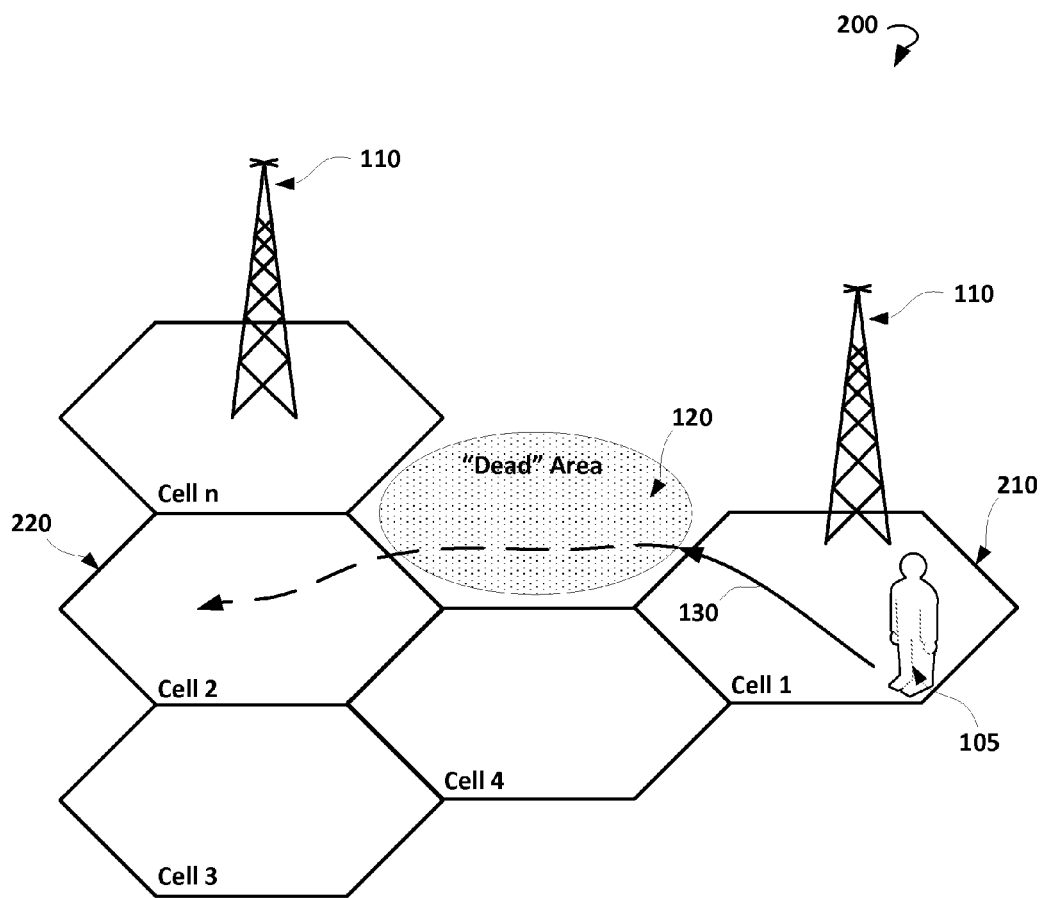
FIG. 2 shows another example system environment suitable for employing methods for warning and/or preventing interruptions in communication services as described herein.

FIG. 2 shows another example system environment 200 suitable for employing methods for warning and/or preventing interruptions in communication services as described herein. The system environment 200 may represent a cellular network or multiple cellular networks, which may provide service to the user 105 utilizing a mobile terminal such as a cellular telephone. The communication network(s) may employ multiple cells served by a plurality of base stations 110. As shown in FIG. 2, the user 105 while located in the cell 210 may travel towards a cell 220, while engaged in an active phone call or active data transfer.

Similarly, it may be predicted if and when the user 105 enters a dead zone 120. Based on the prediction, the active phone call or active data transfer may be transferred from a first communication network to a second communication network before the user 105 enters the dead area 120 (e.g., within a predetermined distance from the area 120). In certain embodiments, based on the prediction, a warning signal can be generated and sent to the mobile terminal of the user 105 when it is determined that the user 105 is within a predetermined distance from the dead zone 120.

In some embodiments, the mobile terminal may include or communicate with a navigational device, such as GPS device. The navigational device may continuously receive location information provide directions to a predefined destination. In some cases, the navigational device can communicate with the mobile terminal to transfer data corresponding to the model and make of the mobile terminal, communications network associated with the mobile terminal, geographical areas associated with previously dropped calls, areas with no service, and so forth.

The navigational device may receive from a notification concerning a planned call or data transfer. Additionally, the navigational device may receive data related to the geographical areas associated with previously dropped calls or not served by the communications network of the mobile terminal. In respond to the notification, the route and directions to the destination may be updated so that navigational services continue uninterrupted.

Figure 3:
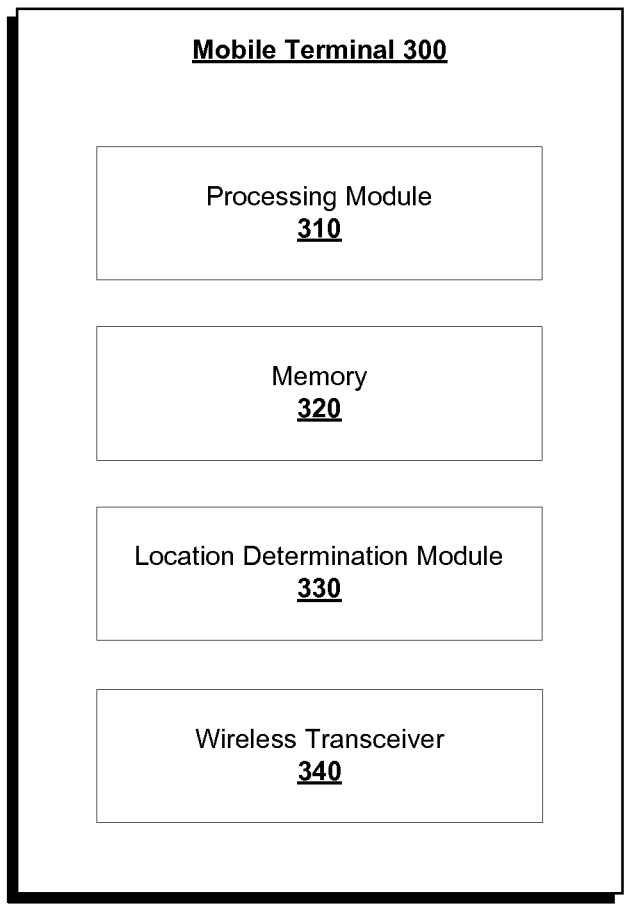
FIG. 3 shows a high level block diagram of mobile terminal, according to an example embodiment.

FIG. 3 shows a high level block diagram of the mobile terminal 300 which may be used by the user 105. The mobile terminal 300 may include a processing module 310 for dynamically tracking the user location, anticipating and predicting that the user 105 approaches an unserved area 120, generating and sending warning signals, performing a handoff, performing data transfer and communication with one or more wireless communications networks, and so forth. The mobile terminal 300 may also include a memory 320, such as a nonvolatile machine-readable medium, which may store instructions executable by the processing module 310 to perform steps of methods discussed herein and/or store historical data regarding unserved areas 120 including their geographical coordinates and past history of dropped calls or interrupted services.

The mobile terminal 300 may also include a location determination module 330 to determine current location of the mobile terminal 300. The location determination module 330 may include a Global Positioning System (GPS) module, Galileo satellite navigation module, Glonas satellite navigation module, triangulation module, and so forth. The mobile terminal 300 may also include a wireless transceiver 340 for performing data transfers and handling phone calls through one or more wireless communications network.

Figure 4:
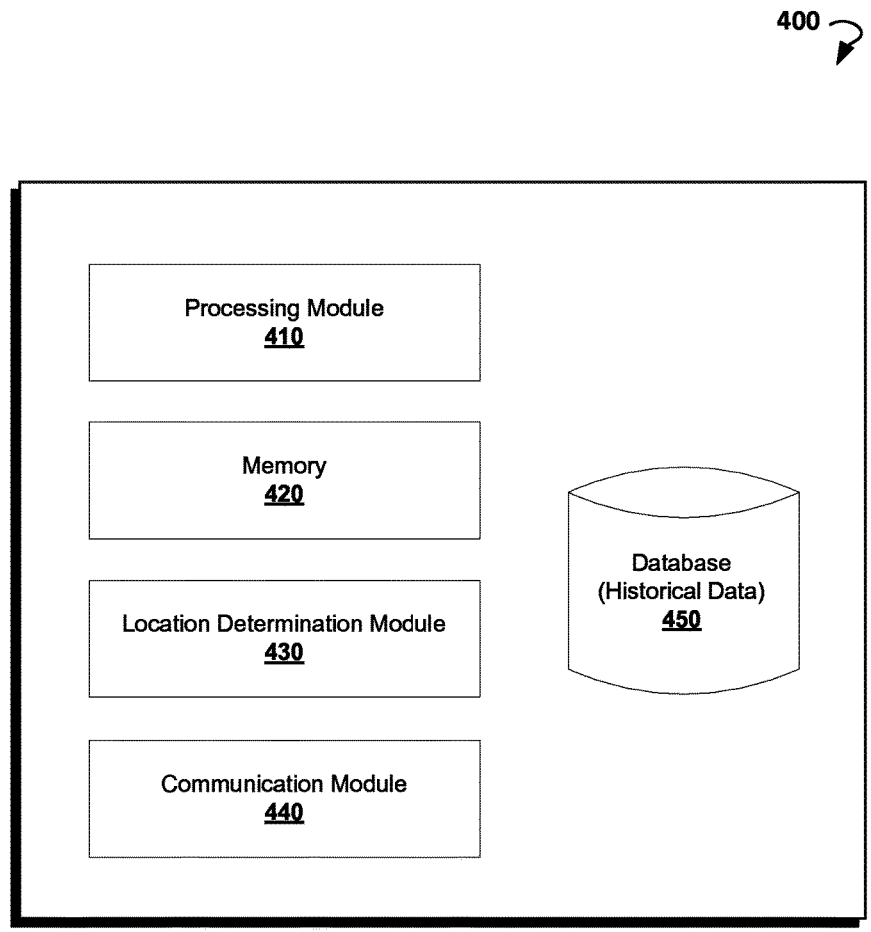
FIG. 4 shows a high level block diagram of web server, according to an example embodiment.

FIG. 4 shows a high level block diagram of a web server 400 which may be used to implement at least some steps of the methods discussed herein. The web server 400 may include a processing module 410 for dynamically tracking current location of the user 105, anticipating and predicting that the user 105 approaches a specific unserved area 120, generating and sending warning signals, facilitating a handoff, performing data transfer and communication with one or more wireless communications networks, and so forth. The web server 400 may also include a memory 420, such as a nonvolatile machine-readable medium, which may store instructions executable by the processing module 410 to perform steps of methods discussed herein and/or store historical data regarding non-serving areas 120 including their geographical coordinates and past history of dropped calls or interrupted services. The web server 400 may also include a location determination module 430 to determine current location of one or more mobile terminals. The web server 400 may also include a communication module 440 for communicating one or more wireless communications network and/or one or more mobile terminals. The web server 400 may also include a database 450 for storing historical data associated with one or more unserved areas 120. The historical data may be crowd-sourced data and may include geographical coordinates, information about past dropped phone calls or interrupted data transfers including carriers, mobile terminal modules and makes, date and time of these events, signal strength, and so forth. As discussed above, the historical data may be utilized in predicting and anticipating that the user 105 is about to enter the non-serving area 120.

Figure 5:
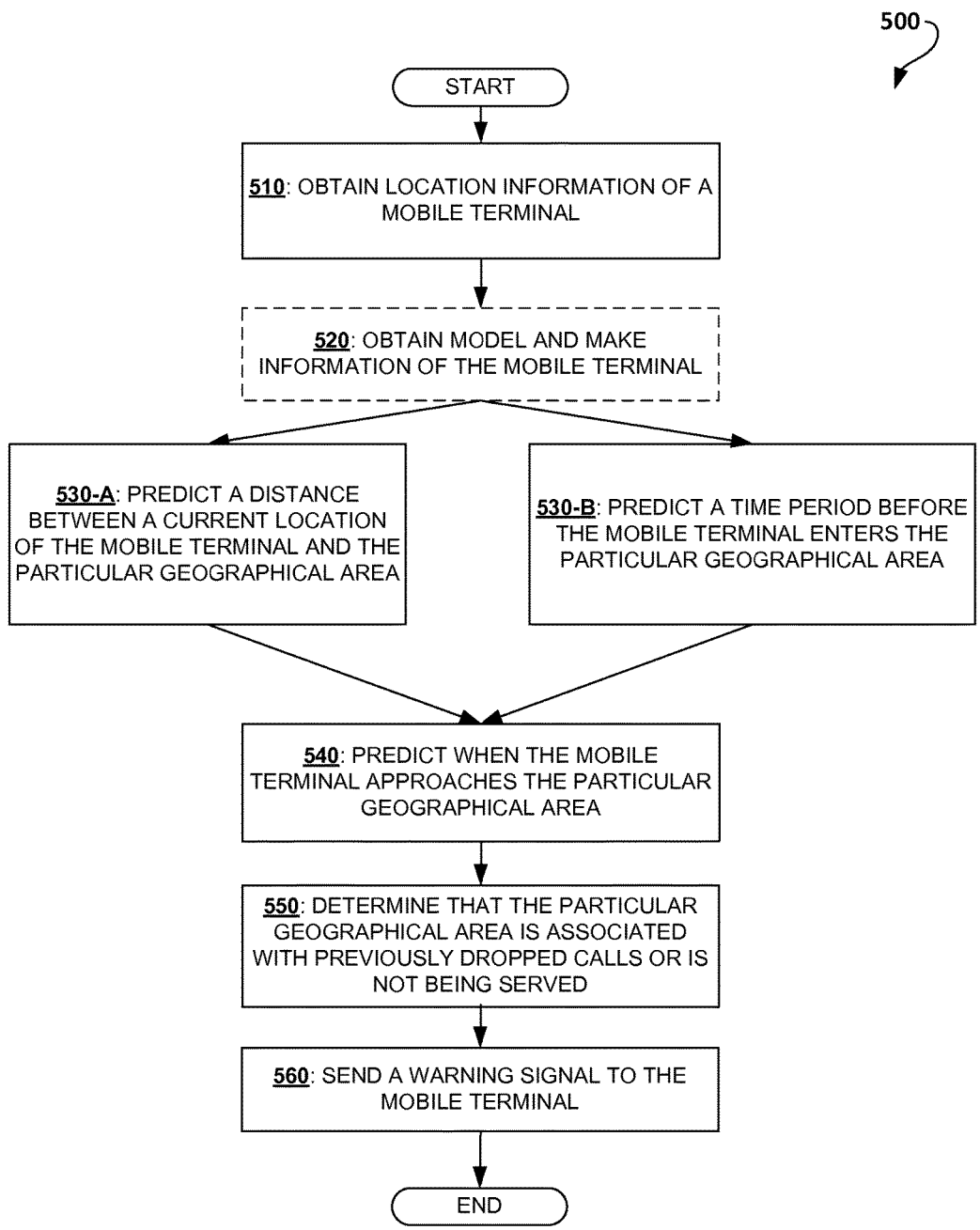
FIG. 5 is a process flow diagram showing a dropped call warning and prevention method according to an example embodiment, according to an example embodiment.

FIG. 5 is a process flow diagram showing a dropped call warning and prevention method 500 according to an example embodiment. The method 500 may be performed by processing logic that may comprise hardware (e.g., dedicated logic, programmable logic, and microcode), software (such as software run on a general-purpose computer system or a dedicated machine), or a combination of both. In some example embodiments, the processing logic can reside at the mobile terminal 300 or the web server 400. In other words, the method 500 can be performed by various units discussed above with reference to FIGS. 1-4.

As shown in FIG. 5, the method 500 may commence at operation 510, with the processing module 310, 410 obtaining location information of a mobile terminal 300. The location information may include a series of geographical coordinates over a period of time. Furthermore, in optional operation 520, the processing module 310, 410 may obtain a model and make information of the mobile terminal 300.

The method 500 then proceed with anticipating in operation 530-A, a distance between the current location of the mobile terminal 300 and a particular (i.e., closest) geographical area 120, which has no network coverage or which is known as the area where the phone calls may be interrupted. In alternative to the operation 530-A or in addition to it, a time period before the mobile terminal 300 enters the particular non-serving, geographical area 120 can be predicted.

Furthermore, at operation 540, the processing module 310, 410 may predict when the mobile terminal 300 approaches the particular geographical area 120 based at least in part on the anticipation operations 530-A and 530-B. In operation 550, the processing module 310, 410 may determine that the particular geographical area 120 is associated with previous dropped call events or that this area is not served based at least in part on the historical data and optionally based on anticipated information as well.

At operation 560, the processing module 310 may generate and send a warning signal to the mobile terminal 300 and optionally to other devices so as to indicate to the user 105 that the mobile terminal 300 is about to enter the particular geographical area 120.

Figure 6:
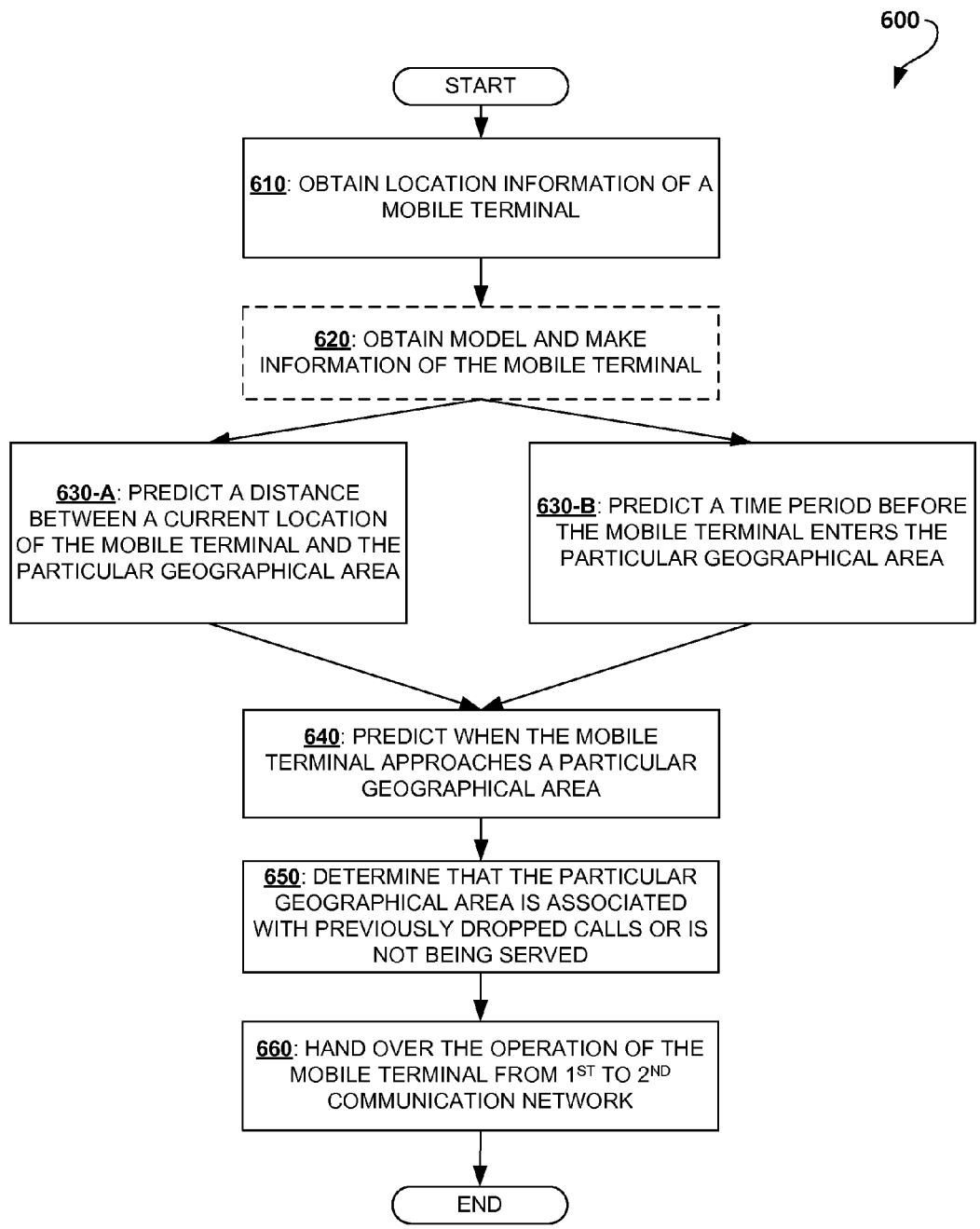
FIG. 6 is another process flow diagram showing a dropped call warning and prevention method, according to an example embodiment.

FIG. 6 is yet another process flow diagram showing a dropped call warning and prevention method 600 according to an example embodiment. The method 600 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the mobile terminal 300 or the web server 400. In other words, the method 600 can be performed by various units discussed above with reference to FIGS. 1-4.

As shown in FIG. 6, the method 600 may commence at operation 610, with the processing module 310, 410 obtaining location information of a mobile terminal 300. The location information may include series of geographical coordinates over a period of time. Further, in optional operation 620, the processing module 310, 410 may obtain model and make information of the mobile terminal 300.

The method 600 may then proceed with anticipating, in operation 630-A, a distance between the current location of the mobile terminal 300 and a particular (i.e., closest) geographical area 120, which has no network coverage by the first wireless communication network, or which is known as the area where the phone calls may be interrupted. Alternatively to the operation 630-A or in addition to it, a time period may be anticipated before the mobile terminal 300 enters the particular unserved, geographical area 120.

Furthermore, at operation 640, the processing module 310, 410 may predict that the mobile terminal 300 approaches the particular geographical area 120 based at least in part on the anticipation operations 630-A and/or 630-B. In operation 650, the processing module 310, 410 may determine that the particular geographical area 120 is associated with previous dropped call events or that this area is not served based at least in part on the historical data and optionally based on anticipated information as well. At operation 660, the processing module 310, 410 may perform or facilitate in performing a handover of the operation from a first wireless communication network to a second wireless communication network, which is different from the first wireless communication network. Thus, the interruption of service may be eliminated.

Figure 7:
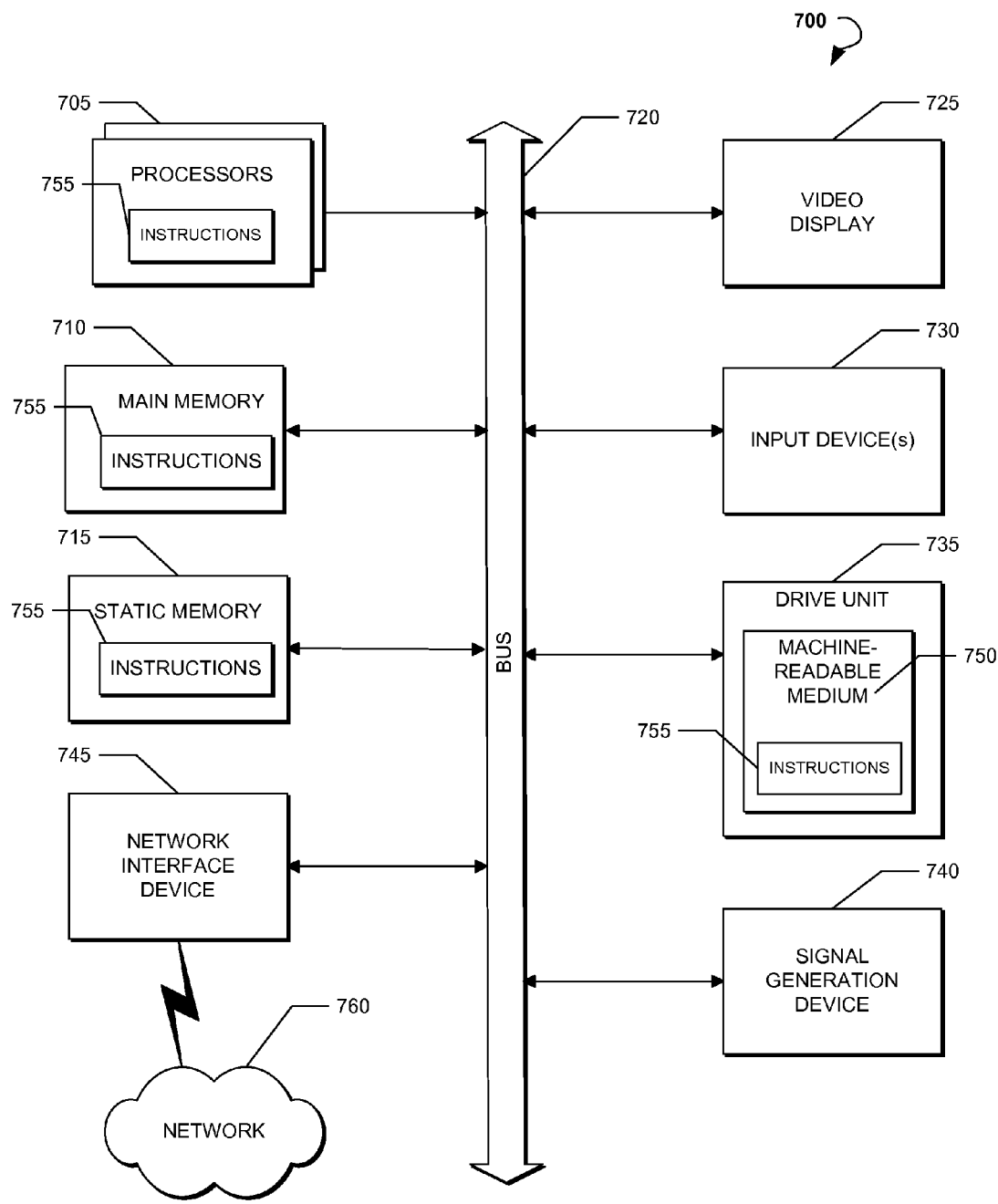
FIG. 7 is a diagrammatic representation of an example machine in the form of a computer system within which a set of instructions for the machine to perform any one or more of the methodologies discussed herein is executed.

FIG. 7 shows a diagrammatic representation of a machine in the example electronic form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU), or both), a main memory 710 and a static memory 715, which communicate with each other via a bus 720. The computer system 700 may further include a video display unit 725 (e.g., a liquid crystal display (LCD) or a cathode ray tube (CRT)). The computer system 700 may also include input devices 730 (e.g., an alphanumeric input device (e.g., a keyboard), a cursor control device (e.g., a mouse)), a disk drive unit 735, a signal generation device 740 (e.g., a speaker), and a network interface device 745.

The disk drive unit 735 includes a non-transitory computer-readable medium 750, on which is stored one or more sets of instructions and data structures (e.g., instructions 755) embodying or utilized by any one or more of the methodologies or functions described herein. The instructions 755 may also reside, completely or at least partially, within the main memory 710 and/or within the processors 705 during execution thereof by the computer system 700. The main memory 710 and the processors 705 may also constitute machine-readable media.

The instructions 755 may further be transmitted or received over a network 760 via the network interface device 745 utilizing any one of a number of well-known transfer protocols (e.g., Hyper Text Transfer Protocol (HTTP)).

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing device 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for warning of and preventing dropped calls and data transfers have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for a dropped call warning, the method comprising:
    obtaining, by a processor:
    location information associated with a mobile terminal, or model and make information of the mobile terminal;
    determining, by the processor, that the mobile terminal approaches a particular geographical area, the particular geographical area being associated with previous dropped calls, the particular geographical area being further associated with a degradation of signal;
    anticipating, by the processor:
        a distance between a current location of the mobile terminal and the particular geographical area, or
        a time period before the mobile terminal enters the particular geographical area;
    based on the determination and the anticipation, sending, by the processor, a warning signal to the mobile terminal indicating that the mobile terminal is about to enter the particular geographical area and that the particular geographical area is associated with the previous dropped calls and the degradation of the signal, the warning signal triggering at least one of an audio indicator and a visual indicator, the warning signal sent to the mobile terminal when:
        the distance is smaller than a threshold distance value associated with the model and make information of the mobile terminal, or
        the time period is smaller than a threshold time value associated with the model and make information of the mobile terminal; and
    performing, by the processor, a transfer of data needed for the particular geographical area, the transfer of data associated with a navigation service provided by the mobile terminal.

2. The method of claim 1, further comprising anticipating, by the processor, a distance between the current location of the mobile terminal and the particular geographical area, wherein the warning signal is sent to the mobile terminal when the distance is smaller than the threshold distance value.

3. The method of claim 1, further comprising anticipating, by the processor, the time period before the mobile terminal enters the particular geographical area, wherein the warning signal is sent to the mobile terminal when the time period is smaller than the threshold time value.

4. The method of claim 1, wherein the warning signal includes an audio message.

5. The method of claim 1, wherein the warning signal includes a displayable message.

6. The method of claim 1, further comprising sending, by the processor, the warning signal to at least one third party mobile terminal engaged in a call.

7. The method of claim 1, wherein the particular geographical area is associated with an area not being served by a communications network associated with the mobile terminal.

8. The method of claim 1, wherein the data includes aggregated data from multiple sources associated with further users of a communications network associated with the mobile terminal, the further users associated with dropped calls within the particular geographical area.

9. The method of claim 1, further comprising facilitating, by the processor, a handoff procedure to another communications network in response to the determination that the mobile terminal approaches the particular geographical area associated with the previous dropped calls.

10. The method of claim 1, further comprising:
determining, by the processor, that the mobile terminal is within the particular geographical area and a connection with a communications network associated with the mobile terminal is lost;
recording, by the processor, speech of a user while the mobile terminal is within the particular geographical area;
determining, by the processor, that the mobile terminal is outside the particular geographical area and the connection with the communications network is restored; and
sending, by the processor, the speech of the user recorded to at least one third party mobile terminal engaged in the call.

11. The method of claim 1, further comprising updating, by the processor, the data if a call is dropped within the particular geographical area.

12. The method of claim 10, wherein the communications network includes a cellular network.

13. The method of claim 10, wherein the communications network includes a wireless local area network based on one or more IEEE 802.11 standards.

14. The method of claim 1, wherein the processor is associated with the mobile terminal.

15. The method of claim 1, wherein the processor is associated with communications network infrastructure not associated with the mobile terminal.

16. A phone call drop prevention method, the method comprising:
obtaining, by a processor:
location information of a mobile terminal, or
model and make information of the mobile terminal;
determining, by the processor, that the mobile terminal approaches a particular geographical area not served by a first communications network, the particular geographical area being further associated with a degradation of signal;
anticipating, by the processor:
a distance between a current location of the mobile terminal and the particular geographical area, or
a time period before the mobile terminal enters the particular geographical area;
based on the determination and the anticipation, sending, by the processor, a warning signal to the mobile terminal indicating that the mobile terminal is about to enter the particular geographical area not served by the first communications network, the warning signal triggering at least one of an audio indicator and a visual indicator, the warning signal sent to the mobile terminal when:
the distance is smaller than a threshold distance value associated with the model and make information of the mobile terminal, or
the time period is smaller than a threshold time value associated with model and make information of the mobile terminal;
based on the determination and the anticipation, facilitating, by the processor, a handoff procedure of the mobile terminal from the first communications network to a second communications network; and
performing, by the processor, a transfer of data needed for that particular geographical area, the transfer of data associated with a navigation service provided by the mobile terminal.

17. The method of claim 16, wherein the first communication network is based on a first communication standard, the second communication network is based on a second communication standard, and the first communication standard differs from the second communication standard.

18. A non-transitory computer-readable storage medium having embodied thereon a program, the program being executable by a processor to perform a call drop prevention method, the method comprising:
obtaining, by a processor:
location information of a mobile terminal, or
model and make information of the mobile terminal;
anticipating, by the processor:
a distance between a current location of the mobile terminal and a particular geographical area, or
a time period before the mobile terminal enters the particular geographical area;
determining, by the processor, that the particular geographical area is associated with historical data associated with dropped calls, the particular geographical area being further associated with a degradation of signal;
based on the determination and the anticipation, sending, by the processor, a warning signal to the mobile terminal indicating that the mobile terminal is about to enter the particular geographical area and that the particular geographical area is associated with previous dropped calls and a degradation of signal, the warning signal triggering at least one of an audio indicator and a visual indicator, the warning signal sent to the mobile terminal when:
the distance is smaller than a threshold distance value associated with the model and make information of the mobile terminal, or
the time period is smaller than a threshold time value associated with the model and make information of the mobile terminal;
based on the determination and the anticipation, facilitating, by the processor, a handoff procedure of the mobile terminal from a first communications network to a second communications network; and based on the determination and the anticipation, performing, by the processor, a transfer of data needed for that particular geographical area, the transfer of data associated with a navigation service provided by the mobile terminal.

* * * * *